(12) United States Patent
Deguchi et al.

(10) Patent No.: US 7,227,504 B2
(45) Date of Patent: Jun. 5, 2007

(54) GATE ANTENNA DEVICE

(75) Inventors: Futoshi Deguchi, Fukuoka (JP);
Hiroshi Yoshinaga, Kasuya-gun (JP);
Masahiko Tanaka, Fukuoka (JP);
Hiroaki Haruyama, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 212 days.

(21) Appl. No.: 10/929,449

(22) Filed: Aug. 31, 2004

(65) Prior Publication Data

US 2005/0057422 A1    Mar. 17, 2005

(30) Foreign Application Priority Data

Sep. 1, 2003   (JP)   ............... 2003-308560
Nov. 21, 2003  (JP)   ............... 2003-392238

(51) Int. Cl.
*H01Q 11/12*   (2006.01)
*H01Q 21/00*   (2006.01)

(52) U.S. Cl. ............... 343/742; 343/855; 343/867
(58) Field of Classification Search ............... 343/702, 343/855, 866, 867, 742
See application file for complete search history.

(56) References Cited

U.S. PATENT DOCUMENTS

| | | | |
|---|---|---|---|
| 4,701,764 A | 10/1987 | Malcombe | 343/742 |
| 4,906,973 A | 3/1990 | Karbowski et al. | 340/551 |
| 5,153,378 A | 10/1992 | Garvy, Jr. | 174/393 |
| 5,258,766 A | 11/1993 | Murdoch | 343/742 |
| 5,360,941 A | 11/1994 | Roes | 361/816 |
| 5,367,291 A | 11/1994 | Fockens | 340/572 |
| 5,602,556 A | 2/1997 | Bowers | 343/742 |
| 5,761,054 A | 6/1998 | Kuhn | 361/818 |
| 6,043,792 A | 3/2000 | Finlayson | 343/867 |
| 6,054,647 A | 4/2000 | Ridener | 174/35 MS |
| 6,127,928 A | 10/2000 | Issacman et al. | 340/572.1 |
| 6,166,637 A | 12/2000 | Cyr et al. | 340/572.7 |
| 6,344,824 B1 | 2/2002 | Takasugi et al. | 343/700 MS |
| 6,356,243 B1 | 3/2002 | Schneider et al. | 343/866 |
| 6,703,935 B1* | 3/2004 | Chung et al. | 340/572.7 |

(Continued)

FOREIGN PATENT DOCUMENTS

JP              01126785         5/1989

(Continued)

OTHER PUBLICATIONS

International Search Report and Written Opinion dated Jan. 24, 2005.

(Continued)

*Primary Examiner*—Shih-Chao Chen
(74) *Attorney, Agent, or Firm*—Stevens, Davis, Miller & Mosher, LLP

(57) ABSTRACT

A gate antenna device has a plurality of loop antennas which supplies power and transmission data to an IC-integrated medium through electromagnetic induction and acquires reception data in the form of a fluctuation of a load from the IC-integrated medium. The plurality of loop antennas include a power-fed loop antenna to which a signal current is supplied and a non-power-fed loop antenna to which no signal current is supplied. The gate antenna device expands the distance and range of communication with an IC-integrated medium and improves the accuracy of communication while suppressing power consumption and leakage electric fields.

19 Claims, 13 Drawing Sheets

U.S. PATENT DOCUMENTS

| | | | |
|---|---|---|---|
| 6,855,883 B1 | 2/2005 | Matsui | 174/393 |
| 2001/0020896 A1 | 9/2001 | Higuchi | 340/572.7 |
| 2002/0011189 A1 | 1/2002 | Leightner et al. | 106/716 |
| 2002/0044096 A1 | 4/2002 | Chung | 343/742 |
| 2003/0052788 A1 | 3/2003 | Kwong-Tai Chung | 340/573.1 |
| 2004/0100413 A1 | 5/2004 | Waldner | 343/742 |
| 2005/0179604 A1 | 8/2005 | Liu et al. | 343/742 |
| 2006/0028384 A1* | 2/2006 | Akiho et al. | 343/742 |

FOREIGN PATENT DOCUMENTS

| | | |
|---|---|---|
| JP | 2000163523 | 6/2000 |
| JP | 2001319192 | 11/2001 |
| JP | 2001326526 | 11/2001 |
| JP | 2002007976 | 1/2002 |
| JP | 2002063552 | 2/2002 |
| JP | 2002279362 | 9/2002 |
| JP | 2003258545 | 9/2003 |
| JP | 2004070804 | 3/2004 |
| JP | 2004140513 | 5/2004 |
| WO | 8907347 | 8/1989 |
| WO | 03061069 | 7/2003 |

OTHER PUBLICATIONS

Office Action dated Dec. 1, 2005 in U.S. Appl. No. 10/875,626.
Office Action dated Jun. 1, 2006 in U.S. Appl. No. 10/875,626.
International Search Report dated Feb. 11, 2005 in U.S. Appl. No. 10/974,031.
Office Action dated Apr. 11, 2006 in U.S. Appl. No. 10/974,031.

* cited by examiner

GATE ANTENNA DEVICE

BACKGROUND OF THE INVENTION

It is an object of the present invention to provide a gate type antenna device which is preferably used in an IC-integrated media reader or reader/writer for supplying power and transmission data to an IC-integrated medium, e.g., a non-contact IC card and acquiring reception data in the form of load fluctuations from the non-contact IC card.

For purposes such as authentication and sorting of destinations of baggage, it is becoming common to use IC-integrated media having ID codes such as IC cards and IC tags and IC-integrated media readers and IC-integrated media readers/writers for authenticating ID codes of such IC-integrated media. When an IC-integrated medium enters a communication range of an antenna of an IC-integrated media reader, an electromagnetic wave from the antenna generates an induction voltage at an antenna of the IC-integrated medium, and the voltage is rectified into power and transmission data which are then supplied to the IC. In the IC-integrated medium to which the power has been thus supplied, according to data read from a memory incorporated therein, a switch is turned on/off according to 1s and 0s in the data by, for example, a modulation circuit which is formed by a load resistance and a switch and which is connected to the antenna. The switching on/off results in a fluctuation of a load applied to the antenna of the IC-integrated medium, and the load fluctuation is transmitted to the antenna of the IC-integrated media reader or reader/writer as a signal. The transmitted signal is demodulated by the IC-integrated media reader or reader/writer to allow execution of authentication of the ID code (for example, see JP-A-1-126785 and JP-A-2000-163523).

In this connection, there is demand for capability of authenticating ID codes of IC-integrated media, for example, by passing baggage or commodities to which the IC-integrated media are attached through a baggage gate at an airport or an entrance or exit of a store. The capability of authenticating ID codes of IC-integrated media is also desired for purposes like checking of the inventory of a commodity which is placed in a commodity showcase and to which an IC-integrated medium is attached. Under the circumstance, it is desired to use an antenna having stable characteristics to prevent erroneous reading and writing. For this reason, antennas which are fed with very high power and which radiate strong electromagnetic waves are used to allow data to be transmitted and received to and from IC-integrated media with high reliability.

In the related art in which a gate antenna device having a plurality of antennas is supplied with power at all of the antennas as disclosed in Japanese Patent Laid-Open No. JP-A-2003-258545, a problem has arisen in that power consumption increases and in that correction of phase shifts of a reception signal on the different antennas is required especially in communicating with a radio communication medium for mutual data communication.

However, the strength of a leakage electric field from induction-type read/write communication facility is limited to a distance of 10 meters by the Radio Law, and the use of an antenna that supplies high power in the excess of the limit is restricted. For this reason, a limit has been placed on efforts toward increases in power fed to an antenna for reliable communication with an IC-integrated medium. The term "IC-integrated media" implies not only IC media such as IC tags, IC cards, ID tags, and ID cards but also various other media which allow radio communication on a non-contact basis.

An increase in the level of power fed to an antenna results in a reduction of a communication range, which has led to a problem that communication with an IC-integrated medium becomes unsatisfactory.

A multiplicity of antennas may be provided in order to expand the range of communication with an IC-integrated medium. When a multiplicity of antennas is provided, however, a problem arises in that there will be a corresponding increase in power consumption, and this is disadvantageous for construction of a system for which low power consumption is desired. 1. Field of the Invention

SUMMARY OF THE INVENTION

The invention solves the above-described problems, and it is an object of the invention to provide a gate antenna device which is preferably used with an IC-integrated media reader or IC-integrated media reader/writer to allow a reduction in transmitting power and increases in a communication distance and a communication range, to prevent any null point in a communication range, and to allow a reduction in the strength of a leakage electric field.

The invention described in claim 1 provides a gate antenna device having a plurality of antennas wherein the plurality of antennas include a power-fed antenna to which a signal current is supplied and a non-power-fed antenna to which no signal current is supplied, an induction current originating from an electronic wave radiated by the power-fed antenna allowing the non-power-fed antenna to perform transmitting and receiving operations.

The invention described in claim 2 provides a gate antenna device wherein the plurality of antennas are antennas which supply power to a radio communication medium through electromagnetic induction and receive data from the radio communication medium. There is an effect of enabling the non-power-fed antenna for transmitting and receiving operations by an induction current originating from an electromagnetic wave radiated by the power-fed antenna.

The invention described in claim 15 wherein the plurality of antennas are loop antennas having an open plane and which the plurality of loop antennas include a power-fed loop antenna to which a signal current is supplied and a non-power-fed loop antenna to which no signal current is supplied. There is an effect of enabling the non-power-fed antenna for transmitting and receiving operations by an induction current originating from an electromagnetic wave radiated by the power-fed antenna.

DESCRIPTION OF THE PREFERRED EMBODIMENTS

Figure 1:
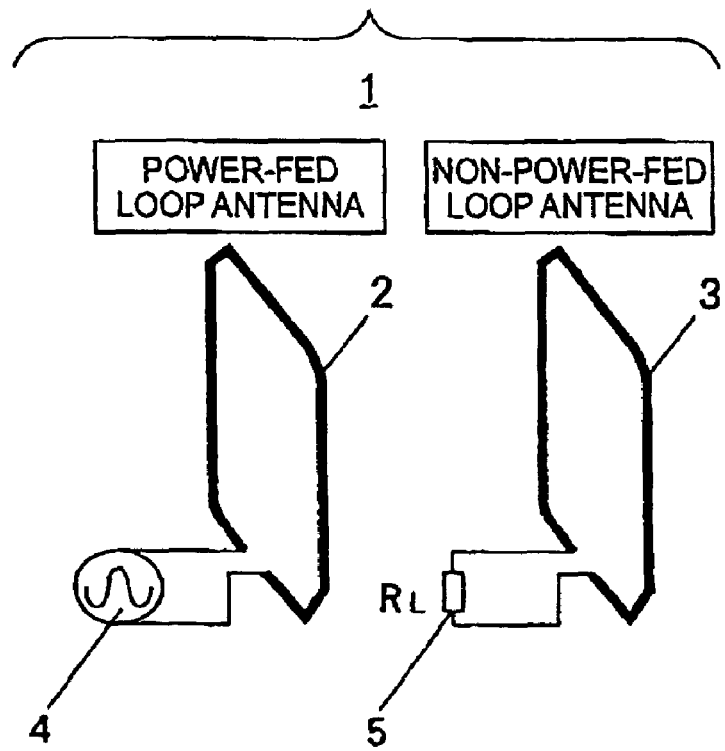
FIG. 1 is a diagram of a configuration of a gate antenna device according to Embodiment 1 of the invention.

Embodiments of the invention will now be described with reference to drawings.

IC-integrated media include non-contact IC cards and IC-tags. The term "IC-integrated media" implies not only IC media such as IC tags, IC cards, ID tags, and ID cards but also various other media which allow radio communication on a non-contact basis.

A power-fed loop antenna is a loop antenna in which self-feeding is performed, i.e., a loop antenna to which a signal current is input by connecting a feeding circuit to a feeding unit of the loop antenna, the loop antenna thus being allowed to radiate an electromagnetic wave by itself to its surrounding.

A non-power-fed loop antenna is a loop antenna in which no self-feeding is performed. When it is stated that no self-feeding is performed, it means that no signal current is directly electrically supplied to a feeding unit of a loop antenna, and the statement does not imply a loop antenna to which a current is supplied based on mutual inductance attributable to an electromagnetic wave generated by another loop antenna. In the context of the present specification, a non-power-fed loop antenna is a loop antenna to which no feeding circuit is connected or to which no signal current is electrically directly supplied even though a feeding circuit is connected and at which a current can be generated by a magnetic field supplied from another loop antenna (which may either be powered or parasitic).

A power-fed loop antenna can be easily changed to a non-power-fed loop antenna and vice versa by connecting or disconnecting a feeding circuit and a power source to a feeding unit of a loop antenna.

Embodiment 1

FIGS. 1, 2, 3, 4, 5, 6, 7, and 8 are configuration diagrams of a gate antenna device according to Embodiment 1 of the invention.

Reference numeral 1 represents a gate antenna device; reference numeral 2 represents a power-fed loop antenna; reference numeral 3 represents a non-power-fed loop antenna; reference numeral 4 represents a feeding unit; reference number 5 represents a terminating resistance; reference numeral 7 represents an electromagnetic wave leakage prevention plate; reference numeral 8 represents a magnetic plate; reference numeral 9 represents a resonance circuit; and reference numeral 10 represents a matching circuit.

First, a basic configuration of the gate antenna device 1 will be described with reference to FIG. 1.

Each of the power-fed loop antenna 2 and the non-power-fed loop antenna 3 may be a loop antenna which has an opening in the middle thereof and whose number of turns is one or more. The power-fed loop antenna 2 and the non-power-fed loop antenna 3 are distinguished from each other depending on whether there is a feeding unit 4 or not (or whether power is fed or not). The configuration of the loops may be any of circular, elliptic, substantially rectangular, and polygonal configurations. Further, the material of the loop antennas may be appropriately selected from among a conductive wire material made of metal, a plate material made of metal, a foil material made of metal, or a tubular material made of metal. The power-fed loop antenna 2 and the non-power-fed loop antenna 3 may be formed in the same configuration from the same material, and different materials may alternatively be used.

As apparent from FIG. 1, the power-fed loop antenna 2 and the non-power-fed loop antenna 3 are provided adjacent to each other, and the antennas are desirably disposed such that their open planes which are principal planes defined by the loops are substantially in parallel with each other. The reason is that an electromagnetic wave radiated by the power-fed loop antenna 2 increases the magnitude of an induction current generated at the non-power-fed loop antenna 3 when the planes are substantially in parallel with each other, which makes it possible to generate a current and a radiation electromagnetic wave at the non-power-fed loop antenna 3 effectively. Referring to the interval between the power-fed loop antenna 2 and the non-power-fed loop antenna 3, it is desirable to maintain such a distance that a sufficient induction current will be generated at the non-power-fed loop antenna 3. Since such a distance or interval is determined by the strength of a magnetic field and electric field which are generated depending on the strength of the current supplied to the power-fed loop antenna 2, an adjustment is desirably made taking those factors into consideration. Desired operations can be achieved even when the open planes are disposed at some angle to each other instead of being substantially in parallel with each other.

The feeding unit 4 is connected to the power-fed loop antenna 2 to supply a signal current having a desired frequency to the same, and an electromagnetic wave is consequently radiated by the power-fed loop antenna 2. The feeding unit 4 may be constituted by an independent signal source and may be connected to a transmission/reception circuit connected to a communication apparatus. The feeding unit 4 is not connected to the non-power-fed loop antenna 3 and, even when they are connected, no power feeding operation is performed in practice.

Operations of the gate antenna device 1 will now be described.

When a signal current is fed to the power-fed loop antenna 2 from the feeding unit 4, a high frequency current which undergoes temporal changes is generated. The temporally changing high frequency current (represented by I1) generates magnetic flux in the power-fed loop antenna 2 according to the screw law. The magnetic flux which undergoes temporal changes in the power-fed loop antenna extends also through the non-power-fed loop antenna 3, and resultant mutual inductance generates an induction voltage at the non-power-fed loop antenna 3 to cause a high frequency current I2 to flow through a load resistance which is present in the non-power-fed antenna 3. Further, the high frequency current I2 which undergoes temporal changes generates magnetic flux in the non-power-fed loop antenna 3 according to the screw law. That is, an electromagnetic wave can be radiated by the non-power-fed loop antenna 3 too, and the non-power-fed loop antenna 3 can therefore operate as an antenna similarly to the power-fed loop antenna 2.

When an IC-integrated medium is present in a region between the power-fed loop antenna 2 and the non-power-fed loop antenna 3 in such a state, an induction voltage is also generated at an antenna of the IC-integrated medium, and power and transmission data are thus supplied to the IC. When the power is fed, a load fluctuation occurs at a modulation circuit of the IC-integrated medium comprising a switch and a load circuit, and the load fluctuation is directly transmitted to the power-fed loop antenna 2 by the action of mutual inductance. Otherwise, the load fluctuation is transmitted to the power-fed loop antenna 2 through the non-power-fed loop antenna 3 and demodulated at a reception circuit to allow authentication of an ID code.

Since not only the power-fed loop antenna 2 but also the non-power-fed loop antenna 3 has an effective communication range consequently, the communication distance and communication range of the device as a whole are increased. Further, since no power is fed to the non-power-fed loop antenna itself, the required power is small. Therefore, there is an advantage that power required for the gate antenna device 1 and an IC-integrated media reader/writer system utilizing the same can be reduced. Furthermore, since there is no need for expanding the communication range only with the power-fed loop antenna 2, the amount of power fed to the power-fed loop antenna 2 can be also reduced. This advantageously allows a further reduction in power consumption and makes an effective contribution to suppression of the strength of leakage electric fields defined in the Radio Law.

While FIG. 1 shows a case in which there is one each power-fed loop antenna 2 and non-power-fed loop antenna 3, the number of each antenna may be two or more, and there may be three or more antennas in total. In this case, the power-fed loop antennas 2 and the non-power-fed loop antennas 3 are preferably alternately arranged in order to increase the communication distance effectively, but they may alternatively be arranged successively. The alternate arrangement allows an induction current to be effectively induced at the non-power-fed loop antennas 3 by the power-fed loop antennas 2. The gate antenna device is similar effective when used in an IC-integrated media reader which performs reading from IC-integrated media only and when used in an IC-integrated media reader/writer which also performs IC writing.

Figure 2:
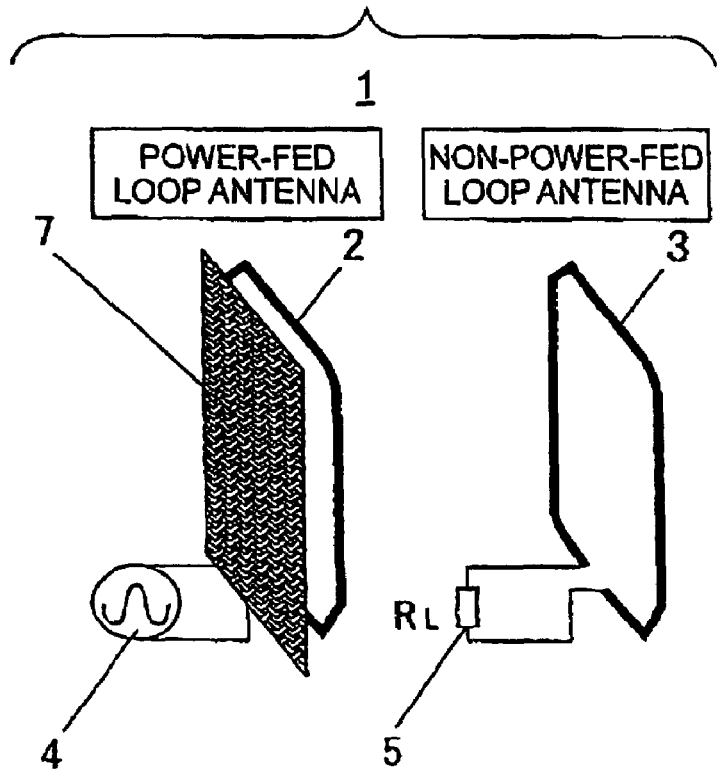
FIG. 2 is a diagram of another configuration of a gate antenna device according to Embodiment 1 of the invention.
Figure 3:
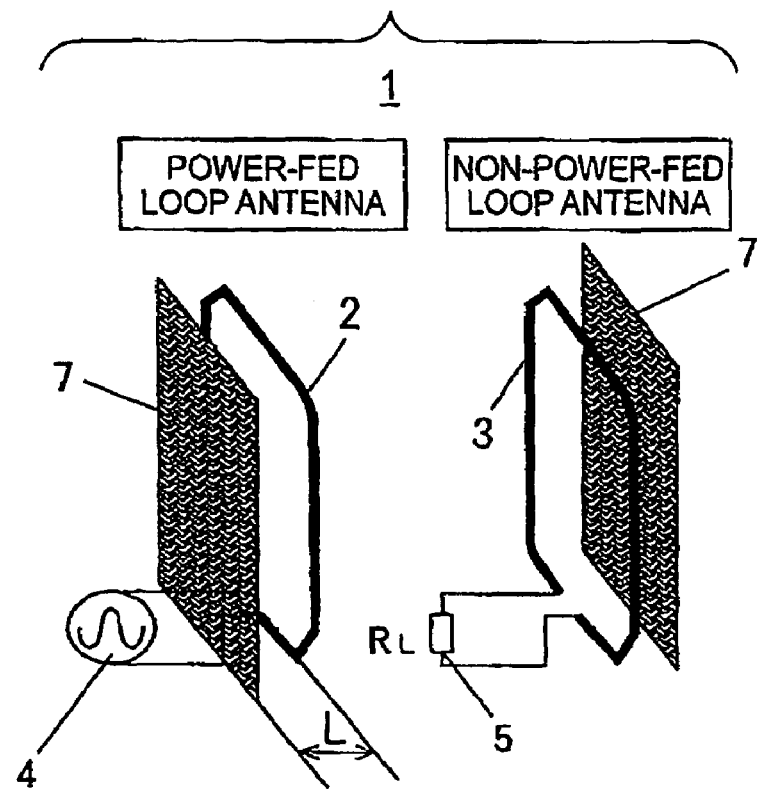
FIG. 3 is a diagram of another configuration of a gate antenna device according to Embodiment 1 of the invention.

FIG. 2 shows a situation in which an electromagnetic wave leakage prevention plate 7 is provided outside the power-fed loop antenna 2. The electromagnetic wave leakage prevention plate 7 is provided outside a region in which the two loop antennas faces each other, and it is provided at least outside the power-fed loop antenna 2 as shown in FIG. 2. Another plate may be also provided outside the non-power-fed loop antenna 3 as shown in FIG. 3. The leakage prevention plate may be in various forms, i.e., it may have a plate-like, sheet-like, film-like or box-like configuration, and the thickness, strength and size of the same may be appropriately determined according to required specifications. A metal plate is normally used as an electromagnetic wave leakage prevention plate 7. The metal plate may be in various forms, i.e., it may have a plate-like, sheet-like, or film-like configuration, and the thickness, strength and size of the same may be appropriately determined according to required specifications. The metal plate may be made of a single metal element, and it may alternatively be an alloy. It may be formed separately from the leakage prevention plate, the magnetic plate, and the antennas, and it may alternatively be formed integrally with some or all of those elements.

Further, the magnetic plate maybe in various forms, i.e., it may have a plate-like, sheet-like, film-like or box-like configuration, and the thickness, strength and size of the same may be appropriately determined according to required specifications.

An electromagnetic wave leakage prevention plate 7 is desirably provided at a predetermined interval from a loop antenna. The reason is that, when the interval approaches about 3 cm in an RF-ID system utilizing the 13.56 MHz band, the impedance of the loop antenna becomes similar to that in a shorted condition in which substantially no electromagnetic wave is radiated. This is because magnetic flux generated at the antenna penetrates through the electromagnetic wave leakage prevention plate 7 to generate an eddy current on the electromagnetic wave leakage prevention plate 7 and the eddy current generates magnetic flux in the opposite direction which offsets the original magnetic flux. If the interval between the electromagnetic wave leakage prevention plate 7 and the loop antenna is very small at this time, the magnetic flux penetrating through the electromagnetic wave leakage prevention plate 7 becomes large, and the eddy current becomes large accordingly. It is therefore desirable to dispose them at a predetermined interval.

The electromagnetic wave leakage prevention plate 7 is constituted by a metal plate or conductor plate to prevent leakage of an electromagnetic wave generated by the loop antenna. It is therefore possible to prevent any adverse effect that is otherwise exerted on other radio apparatus and electronic apparatus prevent in the vicinity of the gate antenna device 1 and to prevent any influence of electronic waves from the other radio apparatus and electronic apparatus. Since the non-power-fed loop antenna 3 also generates an electromagnetic wave, it is further desirable to prevent the electromagnetic wave from affecting the surroundings of the same. Therefore, another electromagnetic wave leakage prevention plate 7 is preferably provided outside the non-power-fed loop antenna 3 as shown in FIG. 3 taking the disposition and cost of the same into consideration. Since the non-power-fed loop antenna 3 is made to operate as an antenna by an induction current originating from the electromagnetic wave from the power-fed loop antenna 2, any influence of other radio apparatus must be avoided. For this reason, it is desirable to provide an electromagnetic wave leakage prevention plate 7 for the same.

Especially, when combinations of the power-fed loop antenna 2 and the non-power-fed loop antenna 3 are alternately arranged to configure a multiplicity of gates, it may sometimes be desirable to have each of the gates operate separately and independently. For example, such an arrangement is desirable when each of the gates is used for IC-integrated media of a different type, modulation/demodulation method, and frequency band. In such a case, since it is important to prevent any mutual interference between different gates, it is desirable to provide an electromagnetic wave leakage prevention plate 7 at each of gaps between the gates. In such a configuration, metal plates are provided in advance in the vicinity of the antennas and are matched and adjusted to antenna impedance at that time, which eliminates a need for adjustment that is otherwise required to cope with influences of the surroundings especially when the antennas are installed in the vicinity of structures made of metal such as a wall. It is therefore possible to improve convenience of the device in that it can be easily installed.

Figure 4:
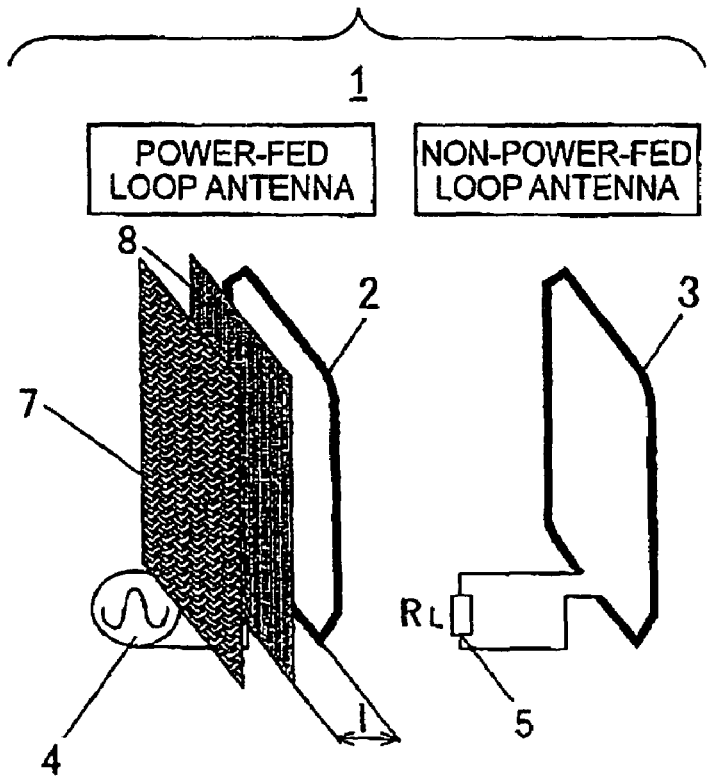
FIG. 4 is a diagram of another configuration of a gate antenna device according to Embodiment 1 of the invention.

Next, FIG. 4 shows a case in which a magnetic plate 8 is provided between the electromagnetic wave leakage prevention plate 7 and the power-fed loop antenna 2. Since the magnetic plate 8 is provided on a side of the power-fed loop antenna 2, a high density part of magnetic flux is concentrated at the magnetic plate 8 on a side of the power-fed loop antenna 2, which allows a loop (closed circuit) of magnetic flux to be formed efficiently. Further, by providing an arbitrary gap between the magnetic plate 8 and the electromagnetic wave leakage prevention plate 7, a part of the magnetic flux is allowed to pass through the gap, which allows the magnetic flux to reach the region surrounded by the power-fed loop antenna 2 and the non-power-fed loop antenna 3 efficiently. Further, since the electromagnetic wave leakage prevention plate 7 is kept out of the region where the magnetic flux concentrates by providing the arbitrary gap, the eddy current generated on the electromagnetic wave leakage prevention plate 7 can be reduced to reduce any force that interfere with the magnetic flux.

Figure 5:
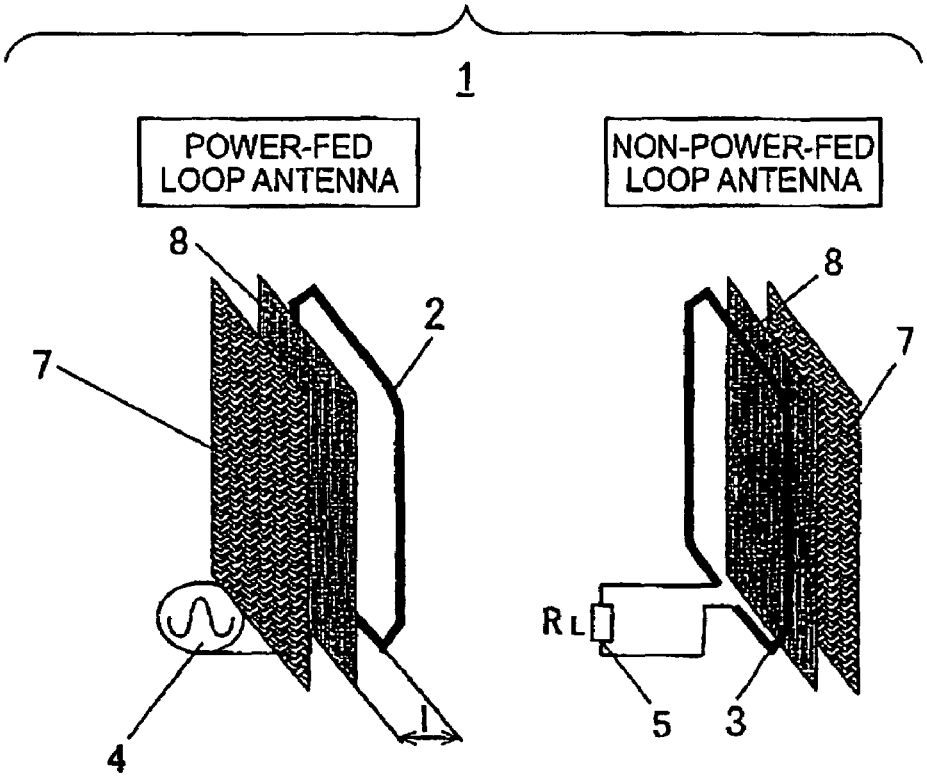
FIG. 5 is a diagram of another configuration of a gate antenna device according to Embodiment 1 of the invention.

Next, FIG. 4 shows a case in which a magnetic plate 8 is provided between the electromagnetic wave leakage prevention plate 7 and the power-fed loop antenna 2. The magnetic flux generated by the power-fed antenna 2 is reflected by the magnetic plate 8, and the magnetic flux is thus concentrated inside the power-fed loop antenna 2 or between the power-fed loop antenna 2 and the non-power-fed loop antenna 3. Further, when another magnetic plate 8 is provided outside the non-power-fed antenna 3 as shown in FIG. 5, the magnetic flux can be concentrated in the gate to a higher degree. Especially, when the electromagnetic wave leakage prevention plate 7 is provided further outwardly from the magnetic plate 8, there is an advantage in that only the magnetic flux can be concentrated inside the gate with the leakage of an electromagnetic wave prevented. Obviously, only the magnetic plate 8 may be provided.

Since an induction current can be effectively excited at the non-power-fed loop antenna 3 using magnetic flux from the power-fed loop antenna 2 by concentrating the magnetic flux inside the gate as thus described, the non-power-fed loop antenna 3 can be efficiently enabled for antenna operations by the power-fed loop antenna 2.

Thus, the communication range can be further expanded, and errors in reading from IC-integrated media can be reduced. The power fed to the power-fed loop antenna 2 can be also reduced.

The electromagnetic wave leakage prevention plate 7 and the magnetic plate 8 desirably have a surface area that is about 1.1 times that of the open plane of a loop antenna. Thus, the prevention of leakage of an electromagnetic wave and the concentration of magnetic flux can be balanced with the prevention of an increase in the size of the gate antenna device 1.

While FIGS. 1 to 5 illustrate a gate antenna device 1 in which a gate is formed by a pair of one each power-fed loop antenna 2 and non-power-fed loop antenna 3, two or more loop antennas may be provided in the vertical direction according to the shape and size of a gate to be configured to provide a gate antenna device which accommodates a gate having a configuration that is longer in the vertical direction.

Figure 6:
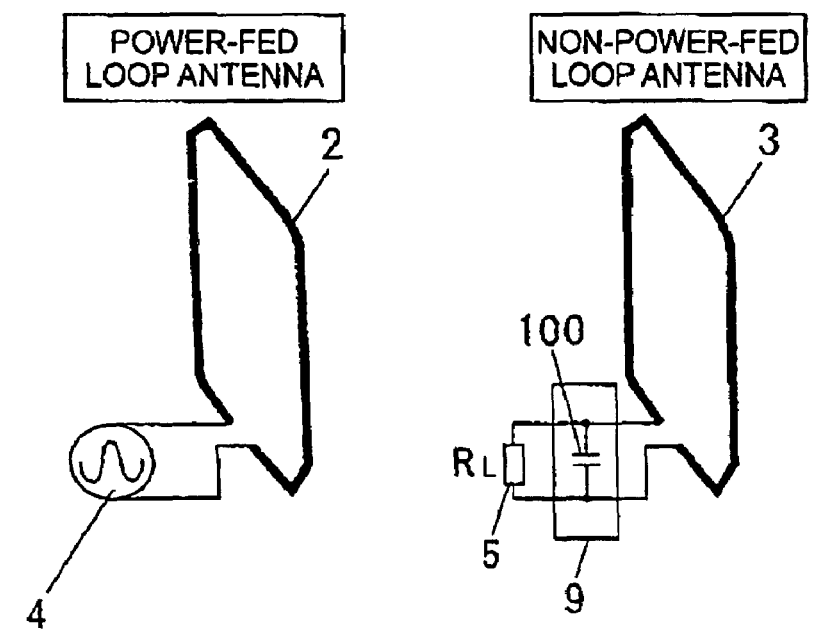
FIG. 6 is a diagram of another configuration of a gate antenna device according to Embodiment 1 of the invention.

Next, FIG. 6 shows a situation in which a resonance circuit 9 is connected to the non-power-fed loop antenna 3. Transmission an reception can be efficiently performed at a desired frequency by generating a resonating condition at the non-power-fed loop antenna 3 with the resonance circuit 9 connected thereto. The resonating condition is expressed by Equation 1.

$$f_0 = 1/2\pi\sqrt{LC} \quad \text{(Equation 1)}$$

A loop antenna includes an inductor component generated depending on the shape of the loop and a resistance component residing in the metal material of which the loop antenna is formed. Therefore, a resonating condition can be easily achieved by connecting a capacitive component to the inductor component in series. Especially, the use of a variable capacitor having a volume (e.g., a trimmer capacitor) as the capacitive component is more effective in that the resonance frequency can be varied. The resonance circuit 9 can be provided by connecting a capacity 100 in parallel, and a variable capacity may be used as the capacity 100 to provide a resonance circuit 9 which accommodates changes in conditions.

Obviously, the resonance circuit 9 may be configured by connecting a capacitor and an inductor in parallel with each other.

Figure 7:
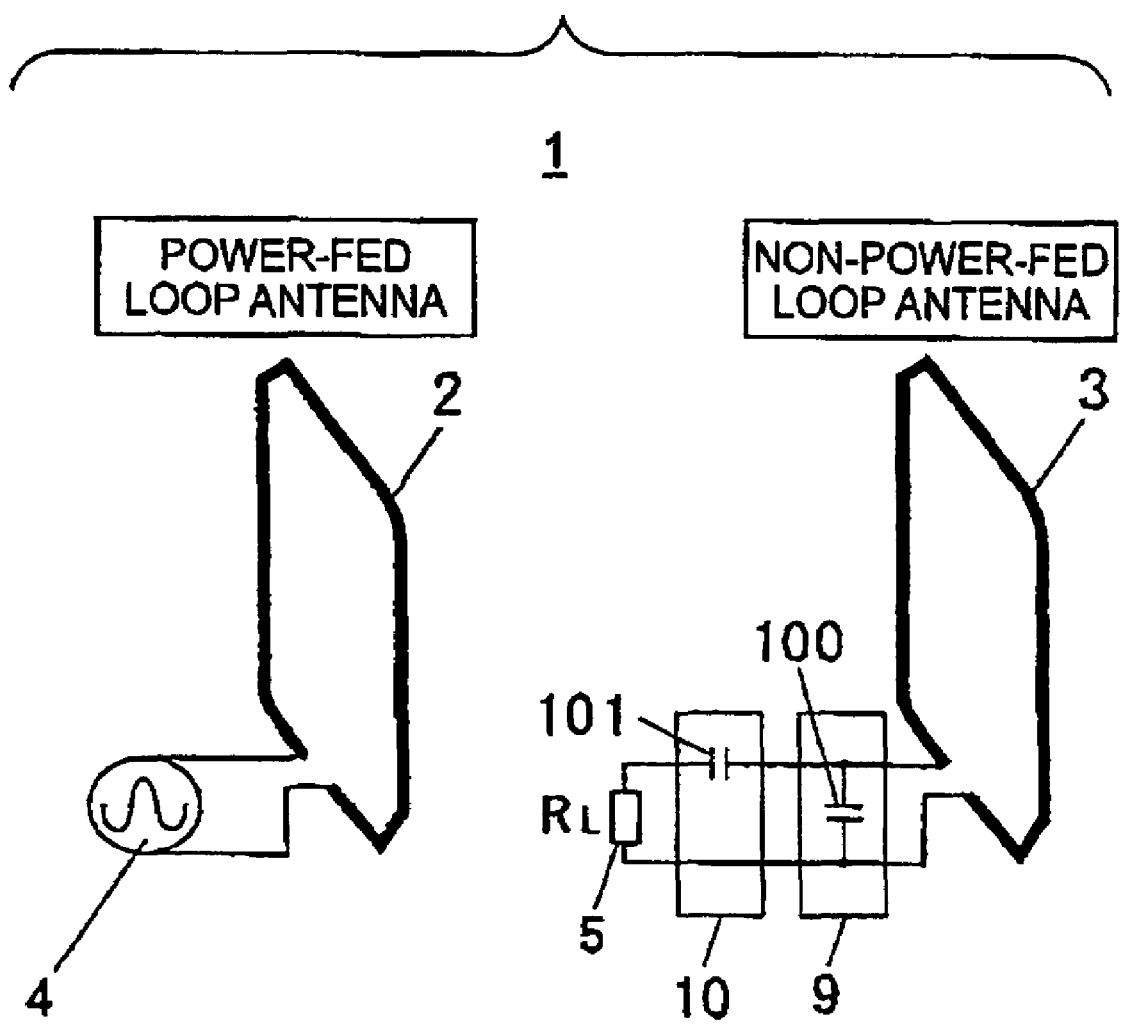
FIG. 7 is a diagram of another configuration of a gate antenna device according to Embodiment 1 of the invention.

Next, FIG. 7 shows a case in which a matching circuit 10 is connected to the non-power-fed antenna 3. The non-power-fed antenna 10 is used for impedance matching. Specifically, the matching circuit 10 is configured using an inductance and a capacitor such that matching with an impedance of 50 ohms or 750 ohms is achieved. The impedance of the matching circuit 10 is preferably determined in consideration to a combined resistance which will be formed by the impedance and a terminating resistance 5. It is preferable to improve the flexibility of impedance matching by utilizing a variable capacity and a variable inductance effectively. In particular, it is desirable to determine impedance components of the matching circuit 10 in consideration to resistive components of the terminating resistance 5, inductance components of the loop antennas, and capacitive components of the resonance circuit 9. The matching circuit 10 can be provided by connecting a capacity 101 in series, and a variable capacity may be used as the capacity 101 to provide a matching circuit 10 which accommodates changes in conditions.

The matching circuit 10 substantially eliminates unnecessary reflected waves at the terminal resistance 5, and this is advantageous in that energy loss is reduced; an electromagnetic wave is more efficiently radiated from the non-power-fed loop antenna 3, and communication with an IC-integrated medium can be performed in an increased range at an improved level.

While matching circuit 10 is desirably connected along with the resonance circuit 9, it may be connected alone depending on situations. As shown in FIGS. 3 to 5, it is also preferably used with the electromagnetic wave leakage prevention plate 7 and the magnetic plate 8.

Figure 8:
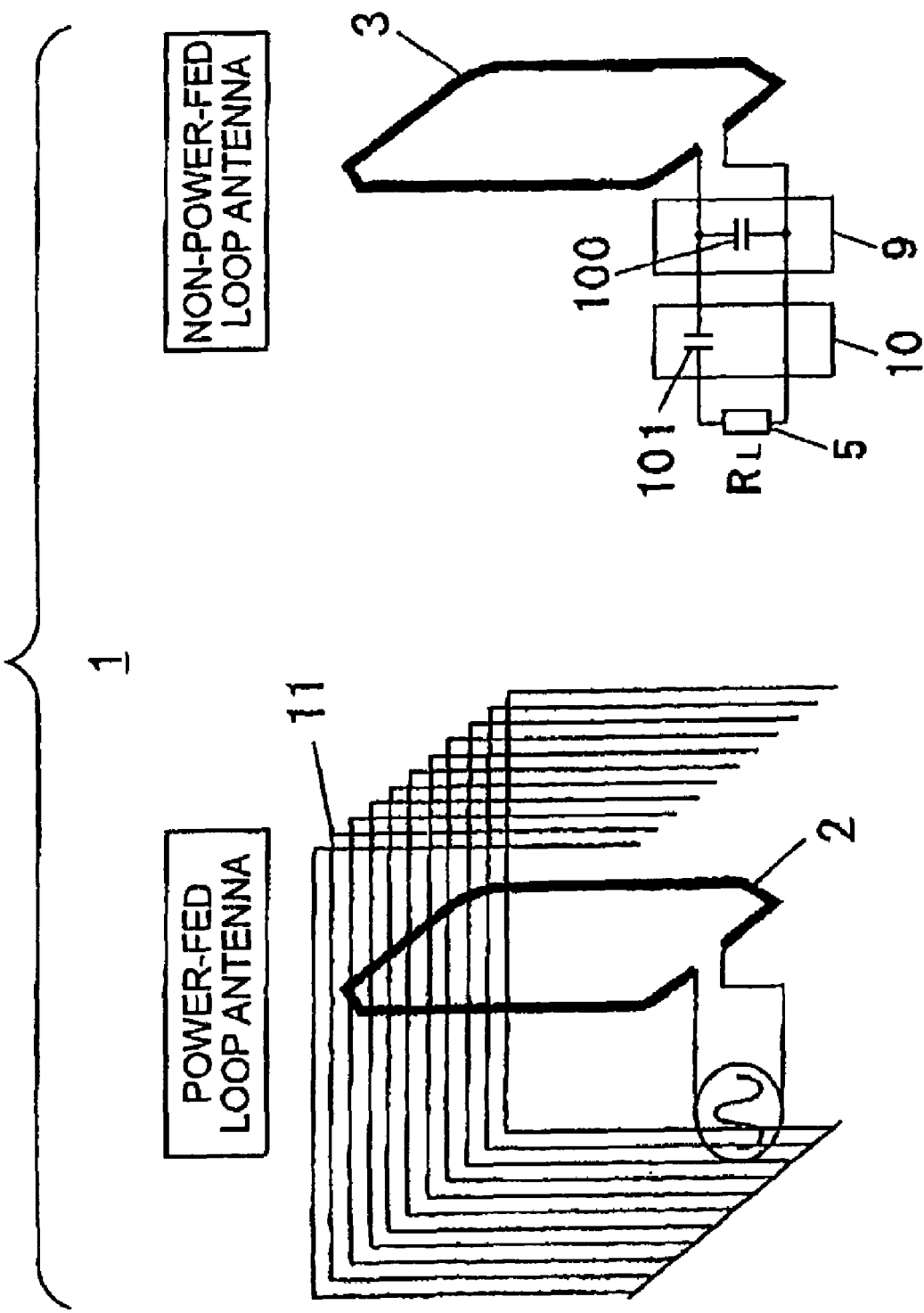
FIG. 8 is a diagram of another configuration of a gate antenna device according to Embodiment 1 of the invention.

Next, FIG. 8 shows a situation in which the power-fed loop antenna 2 is surrounded by a comb-type conductive line.

Reference numeral 11 represents a comb-type conductive line which covers the power-fed loop antenna 2 so as to surround the antenna. By providing the comb-type conductive line 11 such that it surrounds the power-fed loop antenna 2, distant electric fields radiated from the power-fed loop antenna 2 are reduced. Since there is a restriction on the leakage of electric fields from the gate antenna device 1, it is desired to efficiently limit such leakage without any adverse effect on antenna performance.

As described above, by providing the power-fed loop antenna 2 and the non-power-fed loop antenna 3 adjacent to each other, an induction current generated at the non-power-fed loop antenna 3 enables the antenna 3 to operate as an antenna capable of transmitting and receiving an electromagnetic wave. It is therefore possible to expand the range and distance of communication with an IC-integrated medium and to improve the level of communication with the power fed to the antenna kept low. As a result, it becomes possible to read and write an IC-integrated media efficiently with small power consumption.

Embodiment 2

FIGS. 9, 10, 11, and 12 are configuration diagrams of a gate antenna device according to Embodiment 2 of the invention.

Figure 9:
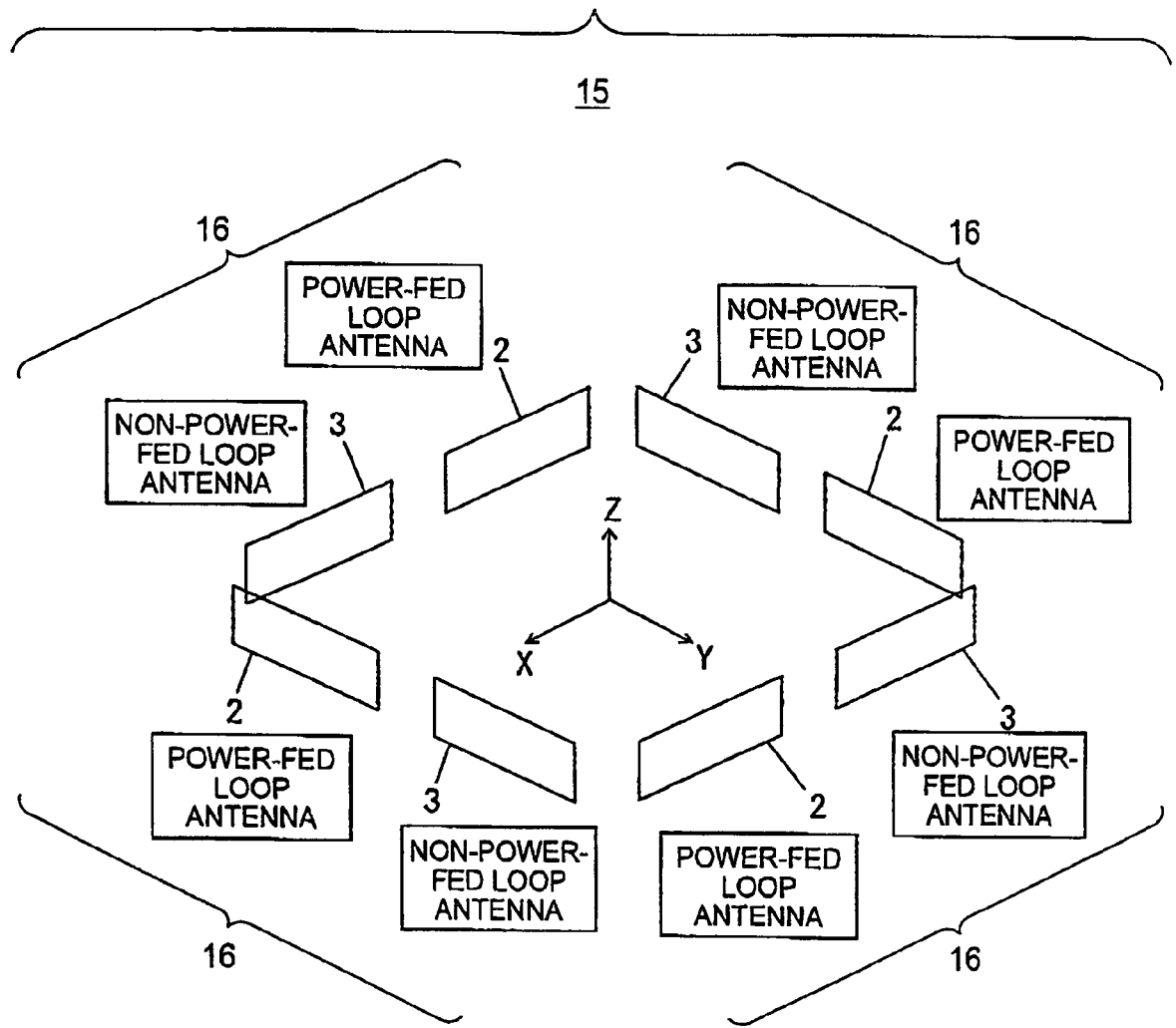
FIG. 9 is a diagram of a configuration of a gate antenna device according to Embodiment 2 of the invention.

Reference numeral 15 represents a gate antenna device, and reference numeral 16 represents a loop antenna set. The loop antenna set 16 is an antenna set constituted by a combination of a power-fed loop antenna 2 and a non-power-fed loop antenna 3. As shown in FIG. 9, a three-dimensional space is represented by three axes, i.e., X, Y, and Z axes, and a loop antenna set 16 is provided on each of four planes defined by the X and Y axes. Specifically, a line drawn substantially vertically to the X-Y plane or drawn along the Z axis is laterally surrounded. The loop antenna sets 16 provided on the four lateral planes surrounding the line are disposed such that they cross each other at a crossing angle of about 90 deg. That is, they may be disposed in the form of a square or rectangle when viewed in the direction of the Z axis. Alternatively, they may be disposed at crossing angles other than 90 deg or may be disposed in the form of a rhombus when viewed in the direction of the Z axis. The disposition may be determined in consideration to the place where the gate antenna device 1 is installed and the communication specifications of the same.

In FIG. 9, one loop antenna set 16 is provided on each of the four lateral planes. Each of the loop antenna sets 16 is constituted by a combination of a power-fed loop antenna 2 and a non-power-fed loop antenna 3. Loop antenna sets 16 adjacent to each other are desirably disposed such that each other's power-fed loop antennas 2 and non-power-fed loop antennas 3 adjoin. Specifically, the loop antennas on the four lateral planes are disposed such that the power-fed loop antennas 2 and the non-power-fed loop antennas 3 alternate. Thus, as described in Embodiment 1, an induction current is efficiently induced at each of the non-power-fed loop antenna 3 by an electromagnetic wave radiated by the power-fed antenna 2, which results in an effect of improving electromagnetic wave transmitting and receiving performance of the non-power-fed loop antennas 3. Specifically, an induction current is generated at a non-power-fed loop antenna 3 by an electromagnetic wave radiated by the power-fed loop antenna 2 included in the same loop antenna set 16 to which the antenna 3 belongs. Further, an induction current is also generated by an electromagnetic wave from the power-fed loop antenna 2 included in another loop antenna set 16 located adjacent thereto. As a result, the non-power-fed loop antenna 3 is also enabled for transmission and reception of an electromagnetic wave and is therefore enabled for communication with an IC-integrated medium. Obviously, since a terminating resistance 5, a resonance circuit 9, and a matching circuit 10 are connected to the non-power-fed loop antennas 3 as described in Embodiment 1, reflected waves can be advantageously attenuated. By providing electromagnetic wave leakage prevention plates 7 and magnetic plates 8 outside the power-fed loop antennas 2 and the non-power-fed loop antennas 3 or on outer sides of the region surrounded by the loop antenna sets 16, an advantage can be also achieved in that unnecessary leakage of electromagnetic waves can be prevented to concentrate magnetic flux in the region surrounded by the loop antenna sets 16. At this time, the electromagnetic wave leakage prevention plates 7 and the magnetic plates 8 may be formed such that they cover the loop antenna sets 16 as a whole.

Since the loop antenna sets 16 formed by power-fed loop antennas 2 and the non-power-fed loop antennas 3 are provided on the four lateral planes, communication with an IC-integrated medium can be very efficiently performed in the range surrounded by them because electromagnetic waves are transmitted and received by each of the power-fed loop antennas 2 and electromagnetic waves are transmitted by the non-power-fed loop antennas 3 which operate on induction currents from the power-fed loop antennas 2. Specifically, when an article having an IC-integrated medium attached thereto is present in the region surrounded by the loop antenna sets 16, communication is established between the article and any of the power-fed loop antennas 2 and the non-power-fed loop antennas 3 located on the four lateral planes, which is advantageous in that communication with the IC-integrated medium is ensured. Further, communication with the IC-integrated medium can be performed in a wider range with higher reliability than in a case wherein a power-fed loop antenna 2 and a non-power-fed loop antenna 3 are disposed in a face-to-face relationship as described in Embodiment 1. Furthermore, the efficient use of the non-power-fed loop antennas 3 allows power consumption to be kept low and also allows the power to each power-fed loop antenna 2 to be suppressed, and the leakage of electromagnetic waves can be prevented as defined in the Radio Law.

While FIG. 9 illustrates the loop antenna sets 16 as being provided on four lateral planes, they may be provided on three lateral planes or five ore more planes. While a loop antenna set 16 has been described as being formed on each plane by one power-fed loop antenna 2 and one non-power-fed loop antenna 3, it may alternatively be formed by two each or more power-fed antennas 2 and non-power-fed loop antennas 3. It is not essential to provide the same number of power-fed loop antennas 2 and non-power-fed loop antennas 3, and the number of the non-power-fed loop antennas 3 may preferably be increased to suppress power consumption further depending on communication specifications.

The X, Y, and Z axes in the drawings and description have been used only for convenience in describing a three-dimensional space, and it is obvious that they do not constitute an absolute basis for position measuring.

Figure 10:
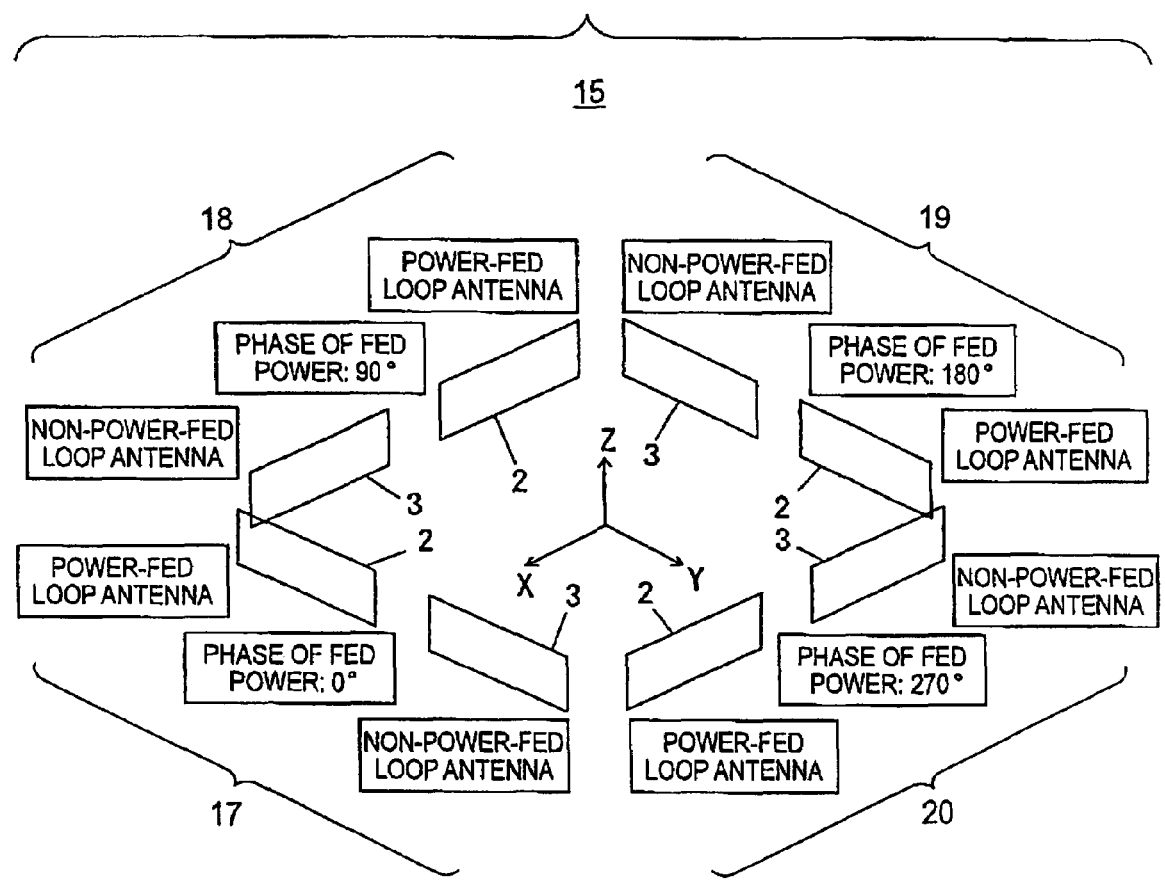
FIG. 10 is a diagram of another configuration of a gate antenna device according to Embodiment 2 of the invention.

FIG. 10 shows a case in which loop antenna sets are provided on four lateral planes on an X-Y plane and in which signals fed to the loop antenna sets respectively are at different phases. Reference numerals 17, 18, 19, and 20 represent the loop antenna sets. The signal fed to the power-fed loop antenna 2 of the loop antenna set 18, the signal fed to the power-fed loop antenna 2 of the loop antenna set 19, and the signal fed to the power-fed loop antenna 2 of the loop antenna set 20 have phase differences of 90 deg, 180 deg, and 270 deg, respectively, on the basis of the phase of the signal fed to the power-fed loop antenna 2 included in the loop antenna set 17. That is, each of the loop antenna sets 17 to 20 provided on the four lateral planes has a phase difference of 90 deg, and the initial phase returns after a tour of the antenna sets.

Since each of the signals fed to the loop antenna sets 17 to 20 provided on the four lateral planes is at a phase difference of 90 deg as thus described, the phase of a magnetic field which is a combination of magnetic fields radiated between opposite ones of the loop antenna sets temporally and spatially rotates in the region surrounded by the loop antenna sets 17 to 20. As a result, the rate of communication such as ID recognition from an IC-integrated medium can be improved regardless of the inclination of the medium.

Figure 11:
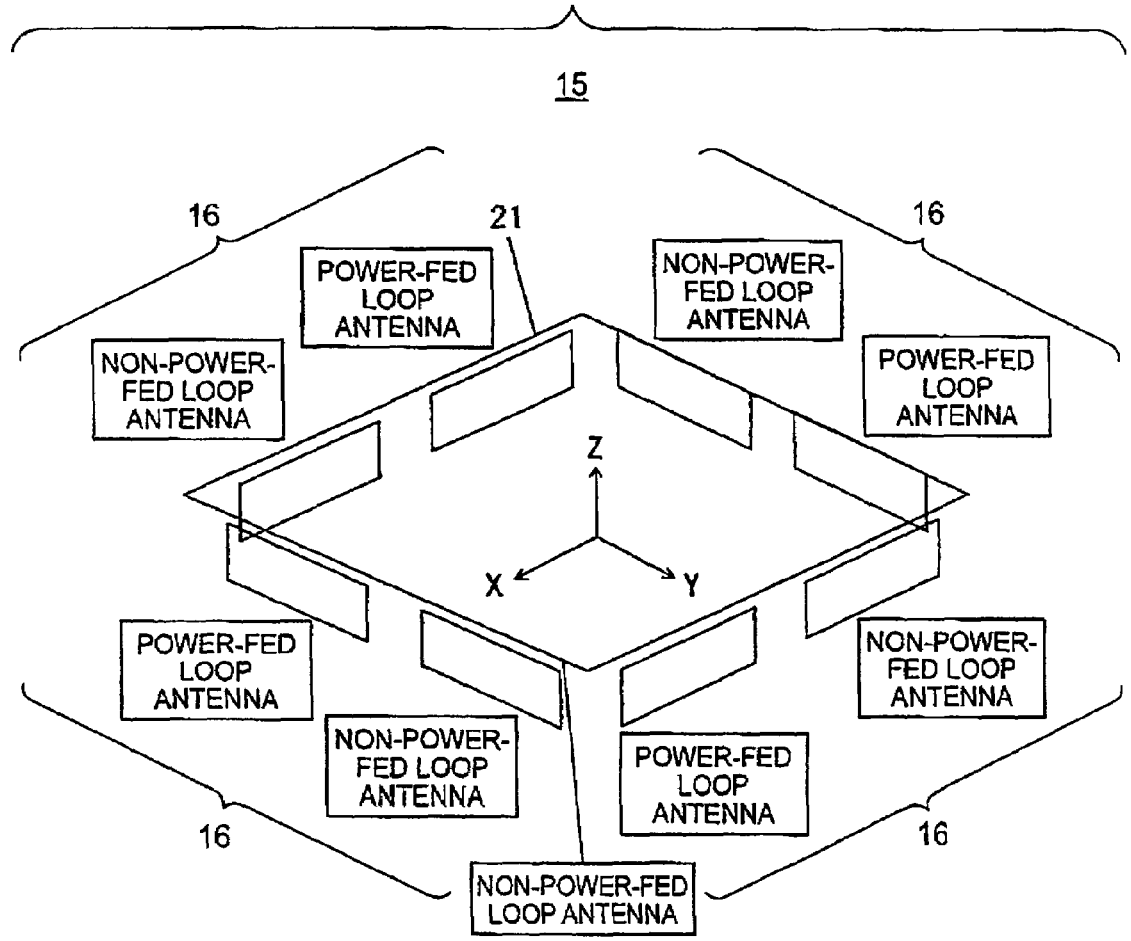
FIG. 11 is a diagram of another configuration of a gate antenna device according to Embodiment 2 of the invention.

FIG. 11 shows a gate antenna device 15 in which a large non-power-fed loop antenna is provided at an opening defined on a plane in the direction of a Z axis in a region surrounded by four lateral planes formed on an X-Y plane.

Reference numeral 21 represents a large non-power-fed loop antenna which is a loop antenna having an opening large enough to cover a region defined by loop antennas 16 provided on the four lateral planes on the X-Y plane. At this time, an induction current is generated at the large non-power-fed loop antenna 21 by an electromagnetic wave from a power-fed loop antenna to enable the antenna 21 for transmitting and receiving operations. While the large non-power-fed loop antenna 21 is specified as "large" for convenience because it has the opening which covers the region defined by the loop antenna sets 16, it is obvious that the loop antenna itself is not required to be large in light of the general concept of such an element. Although the large non-power-fed loop antenna 21 is provided on the Z axis in FIG. 11 for convenience of description, the positional relationship between the X, Y, and Z axes is not limited to FIG. 11. When the loop antenna sets 16 are provided on four lateral planes defined on the basis of the X and X axis. While the loop antenna sets 16 which are combinations of a power-fed loop antenna 2 and a non-power-fed loop antenna 3, there is no restriction on such combinations and, for example, two or more power-fed loop antennas 2 may be provided on each of the four lateral planes. With such a gate antenna device 15, the directivity of an electromagnetic wave is maintained substantially in all directions in the region surrounded by the loop antennas to form a communication area which has no null point.

A gate antenna device having the above-described configuration is advantageous in that communication with an IC-integrated medium can be established regardless of the orientation of the medium when an article to which the IC-integrated medium is attached moves in the direction of the Z axis. For example, let us assume that such a configuration is employed for a gate antenna device through which pieces of baggage having IC-integrated media such as IC cards attached thereto pass one after another, e.g., a baggage check gate or distribution check system. In such a case, IC-integrated media will be in a variety of positions and orientations. The loop antennas provided on the X, Y, and Z axes are advantageous in that they ensure communication and substantially miss mo medium. Especially, an effective communication range can be provided by disposing the greatest opening in the moving direction of pieces of baggage having IC-integrated media attached thereto and disposing the large non-power-fed loop antenna 21 at the opening. Since a part of the loop antenna sets 16 are non-power-fed loop antennas 3 and the large non-power-fed loop antenna 21 is also supplied with no power, power consumption can be very low, and leakage of electromagnetic waves can be reduced. It is therefore possible to configure a gate antenna device which allows reliable communication with IC-integrated media while being user-friendly in that it exerts less influence on the surroundings and consumes less power.

Although the large non-power-fed loop antenna 21 is provided only on one side of the loop antenna sets 16 in the direction of the Z axis, it may preferably be provided on both sides of them.

Figure 12:
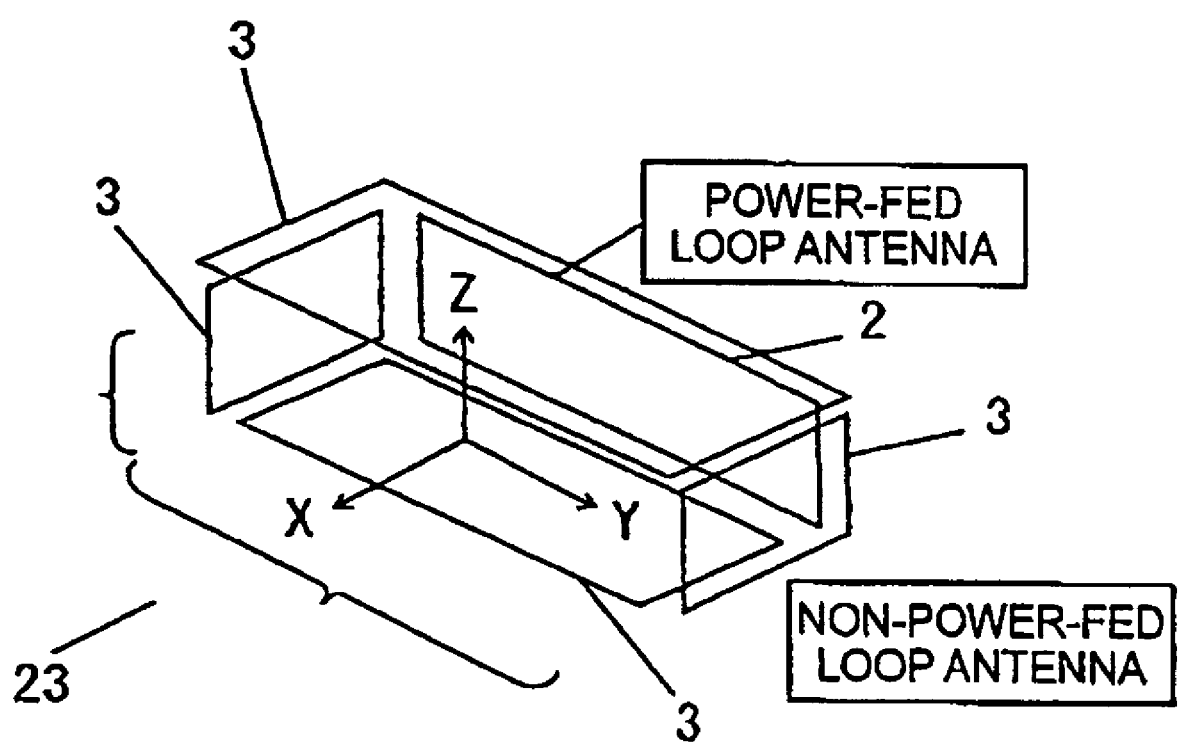
FIG. 12 is a diagram of another configuration of a gate antenna device according to Embodiment 2 of the invention.

FIG. 12 shows a gate antenna device designed on the basis of a six-sided body that is present in a three-dimensional space represented by X, Y, and Z axes. Reference numeral 22 represents the gate antenna device, and reference numeral 23 represents an open plane which is formed by power-fed loop antennas 2 and non-power-fed loop antennas 3.

The open plane 23 is an open plane which is provided on any one or more sides of the six-sided body. For example, such a gate antenna device 22 may be incorporated in a commodity showcase. The open plane 23 may be provided on any one side or two or more sides.

The gate antenna device 22 is configured by disposing one or more power-fed loop antennas on sides of the six-sided body other than the open plane 23, non-power-fed loop antennas 3 being disposed on the remaining sides that are available. In FIG. 12, there is one power-fed loop antenna 2, and the remaining four antennas are non-power-fed loop antennas 3. Two or more power-fed loop antennas 2 maybe provided, and loop antenna sets 16 as described with reference to FIG. 10 may be provided on each side of the six-sided body.

In the gate antenna device 22 having such a configuration, an induction current is generated at the non-power-fed loop antennas 3 by an electromagnetic wave radiated by the power-fed loop antenna 2. Thus, the non-power-fed loop antennas 3 is also enabled for electromagnetic wave transmitting and receiving operations, and all of the loop antennas operate as antennas. As a result, communication can be established with an IC-integrated medium present in the region surrounded by the loop antennas regardless of the orientation of the same. Transmission and reception can be performed at a desired frequency by connecting a terminating resistance, a matching circuit, and a resonance circuit to each of the non-power-fed loop antennas 3. Therefore, when a certain frequency is specified for communication with IC-integrated media, communication is further ensured by connecting a resonance circuit according to the specification.

For example, when the gate antenna device 22 is mounted in a commodity showcase, it can reliably communicate with an IC tag attached to a commodity displayed therein. Further, when the commodity is taken out from the showcase, the situation is recognized through communication. As a result, a commodity managing system can be easily configured, and commodity management can be efficiently and easily carried out. It is obvious that the use of the non-power-fed loop antennas 3 allows such advantages to be achieved with power consumption kept very low.

When an electromagnetic wave leakage prevention plate 7 or magnetic plate 8 is provided outside each of the loop antennas, there will be an effect of preventing the leakage of an electromagnetic wave and concentrating magnetic flux in the inner region surrounded by the loop antennas efficiently. Such an effect can be easily achieved by mounting the gate antenna 22 in a shelf board that is constituted by an electromagnetic wave leakage prevention plate 7 when the antenna is mounted in the showcase.

By disposing the loop antennas and the loop antenna sets 16 on each of the X, Y, and Z axes appropriately in the three-dimensional space described above, it is possible to configure a communication range in which substantially no null point exists for an IC-integrated medium existing in or passing through the region. The IC-integrated medium can therefore be reliably read and written in a wide range. Further, the effective utilization of the non-power-fed loop antennas allows a great reduction in power consumption and a reduction in leakage electromagnetic waves.

Although loop antennas in a loop-like configuration having an open plane have been described, the description holds true for not only loop antennas but also a variety of antennas including linear or bar-shaped conductor antennas, rod antennas, pattern antennas which are conductors printed on a substrate, helical antennas, chip antennas, and meander antennas.

Embodiment 3

Figure 13:
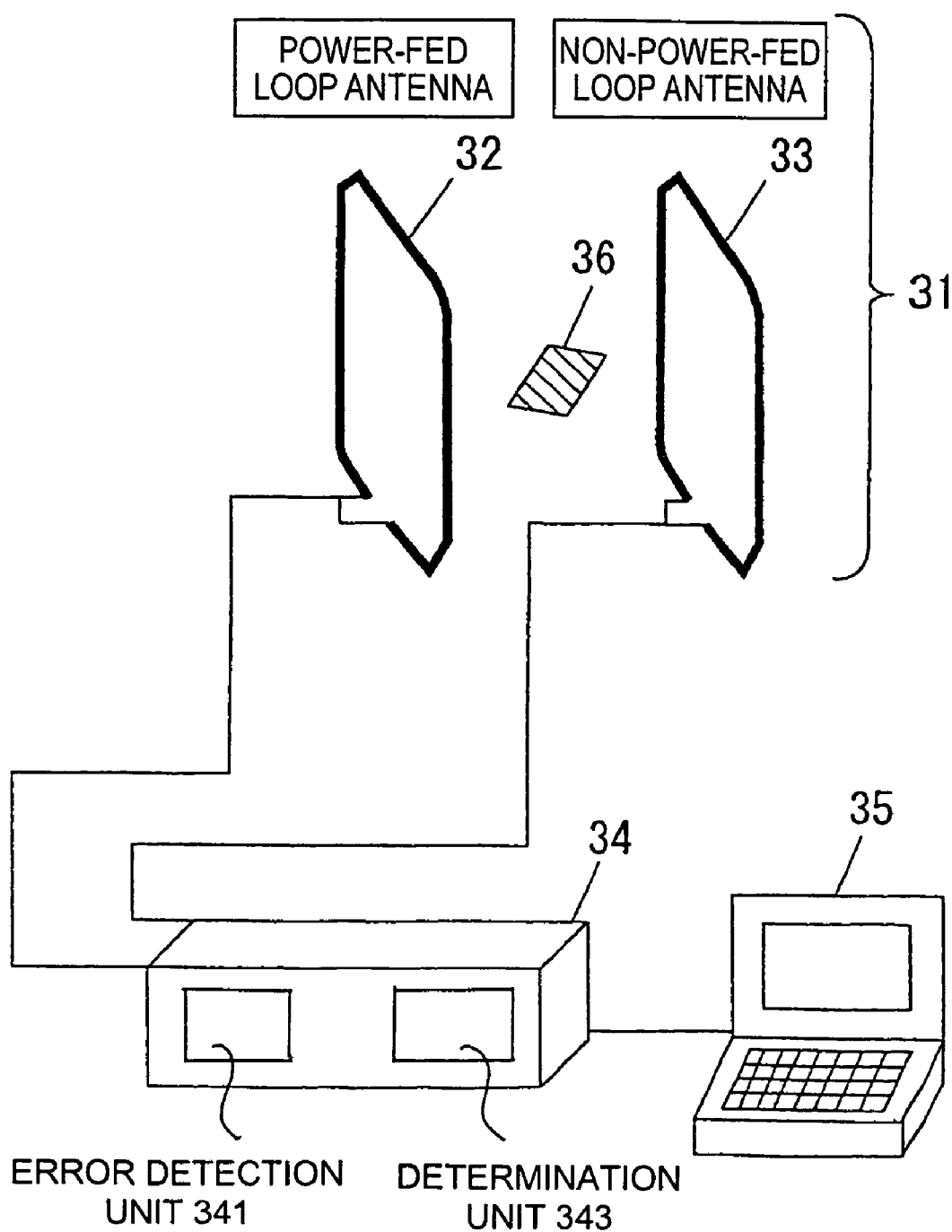
FIG. 13 is a diagram of a configuration of an IC-integrated reader/writer according to Embodiment 3 of the invention.

FIG. 13 is a configuration diagram of an IC-integrated media reader/writer according to Embodiment 3 of the invention.

Reference numeral 30 represents an IC-integrated media reader/writer; reference numeral 31 represents a gate antenna device; reference numeral 32 represents a power-fed loop antenna; reference numeral 33 represents a non-power-fed loop antenna; reference numeral 34 represents a reader/writer apparatus; reference numeral 35 represents a display; and reference numeral 36 represents an IC-integrated medium. The IC-integrated media reader/writer 30 may perform reading from the IC-integrated medium 36 only or may perform also writing of the IC-integrated medium 36. An operation of demodulating a signal received from the IC-integrated medium 36 may be performed in the former case, and a modulated signal may be transmitted to write it in the IC-integrated medium 36 in the latter case.

The IC-integrated medium 36 passes through a region sandwiched by the power-fed loop antenna 32 and the non-power-fed loop antenna 33. At the non-power-fed antenna 33, an induction current is generated by a temporally changing high frequency current from the power-fed loop antenna 32 through the action of mutual inductance, which allows the antenna 33 to perform transmitting and receiving operations as an antenna. When the IC-integrated medium 36 resides in the region at this time, each of the power-fed loop antenna 32 and the non-power-fed loop antenna 33 supplies power and a signal to the IC-integrated medium 36. That is, an induction voltage is generated also at the IC-integrated medium 36, and the voltage is rectified to supply power and transmission data to the IC-integrated medium 36.

When the power is fed, the IC-integrated medium 36 generates a load fluctuation according to data from a memory incorporated therein, and the load fluctuation is transmitted to the power-fed loop antenna 32 directly by the action of mutual inductance or transmitted to the power-fed loop antenna 32 through the non-power-fed loop antenna 33. The signal transmitted to the power-fed loop antenna 32 is input to the reader/writer apparatus 34 through a transmission path. The reader/writer apparatus 34 includes demodulation means which demodulates data from the received signal, error detection means which detects an error in the demodulated data or error correction means 341 which corrects an error, and a determination unit 343 or authentication means which authenticates the demodulated data. Further, data modulation means which performs data writing on the IC-integrated medium 36 is also included as occasions demand.

Referring first to writing, data modulated by the data modulation means are transmitted from the loop antenna to the IC-integrated medium 36 concurrently with the supply of power to perform writing in the memory in the IC-integrated medium. As a result, for example, an ID code can be assigned to the IC-integrated medium 36 when it passes through the region of the gate antenna device 31 on a wireless basis.

Referring now to reading, the demodulation means demodulates data from a signal which has been modulated using amplitude modulation, frequency modulation or phase modulation after performing synchronization detection and delay detection on the signal. Error detection such as parity check or cyclic code check is performed on the demodulated data, and data is reacquired when there is any error. Alternatively, error correction such as Viterbi decoding or Reed-Solomon decoding may be performed.

The demodulated data from which errors have been eliminated are subjected to determination at the authentication means on whether the ID code is correct or not. For example, it is determined whether an IC-integrated medium 36 which has passed through the device has a correct ID code or not, and the result is output to the display. Thus, the IC-integrated medium is authenticated on a wireless basis.

At this time, since the use of the gate antenna device 31 allows communication with the IC-integrated medium 36 to be performed in a wide range with high reliability while suppressing power consumption and leakage of electromagnetic waves as described in Embodiment 1, reading errors and writing errors are significantly reduced.

The gate antenna device 31 may be constituted by a pair of a power-fed loop antenna 32 and a non-power-fed loop antenna 33 and, alternatively, a plurality of power-fed loop antennas and non-power-fed loop antennas may be alternately arranged. Alternatively, the loop antenna sets maybe provided in an X-Y-Z space which is a three-dimensional space as shown in FIG. 10. Further, the loop antennas may be provided on a six-sided body as shown in FIG. 12.

The display 35 may be a liquid crystal display screen or a display screen of a personal computer, or it may be a simple LED display. When a personal computer is used as the display 35, it may be used also as a processor for feeding a processing procedure to the reader/writer device 34. The display 35 may be a device that is integral with the reader/writer device 34. Alternatively, the authentication means may be provided as a program in a personal computer which serves also as the display 35. The demodulation means, the modulation means, the error detection means, the error correction means, and the authentication means may be partially or entirely implemented as a dedicated circuit. Those means may be integrated in an integrated circuit or configured on a software basis.

The gate antenna device 31 may be an integral device, and a system may alternatively be provided which includes binary data enabling the device as a whole and a processing procedure in the form of a program for processes thereof.

An IC-integrated media reader/writer incorporating a gate antenna device 31 as described above allows read and write on an IC-integrated medium for which reliable communication is established in a wide communication range.

Embodiment 4

Figure 14:
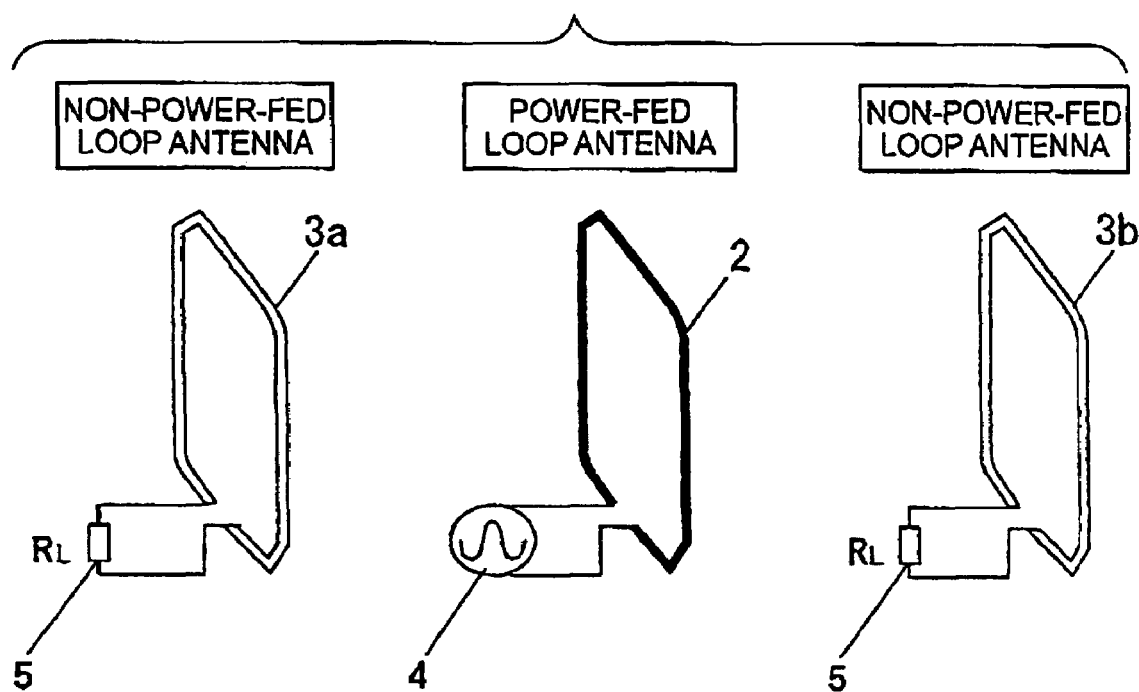
FIG. 14 is a diagram of a configuration of a gate antenna device according to Embodiment 4 of the invention.
Figure 15:
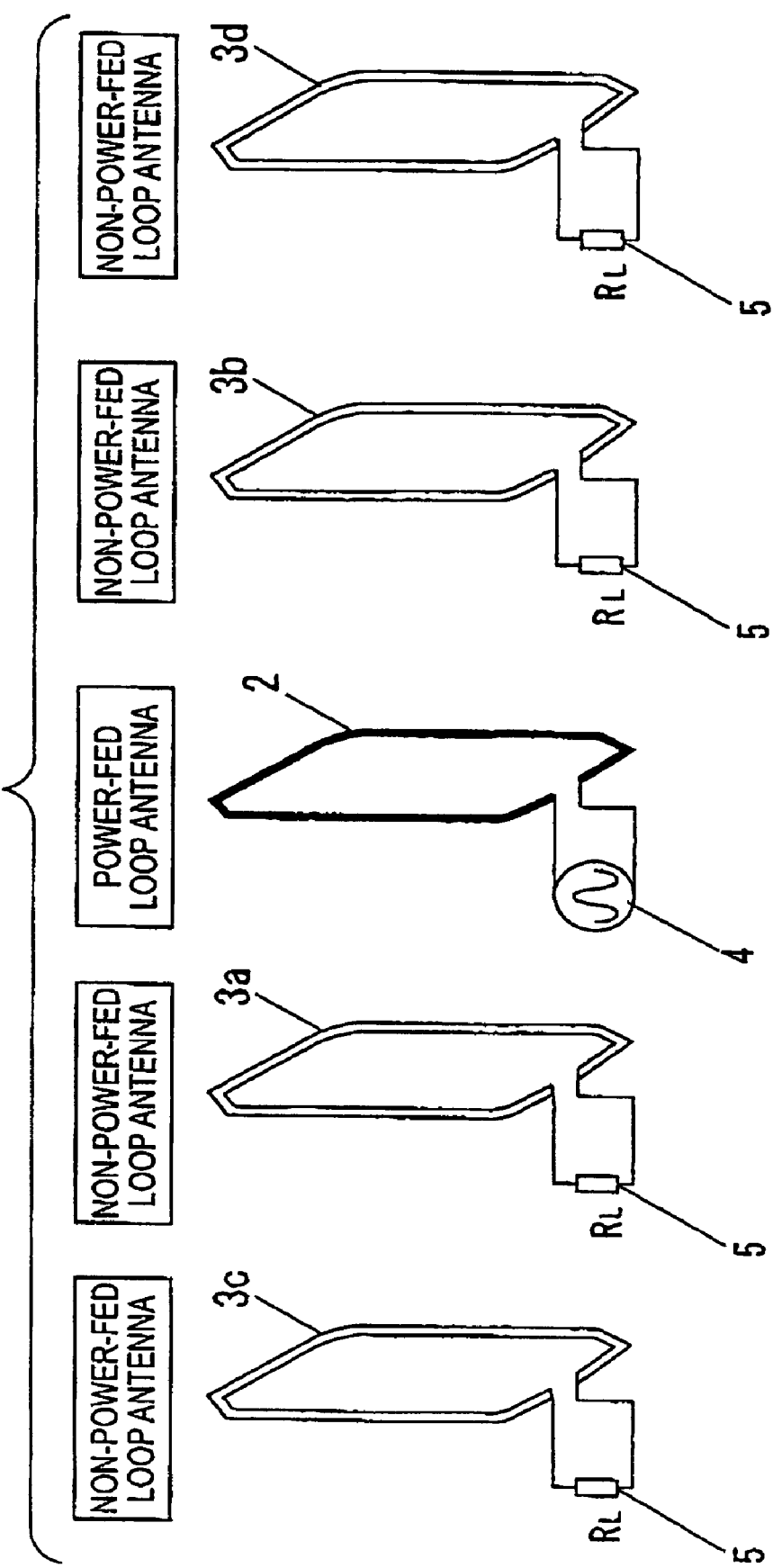
FIG. 15 is a diagram of another configuration of a gate antenna device according to Embodiment 4 of the invention.
Figure 16:
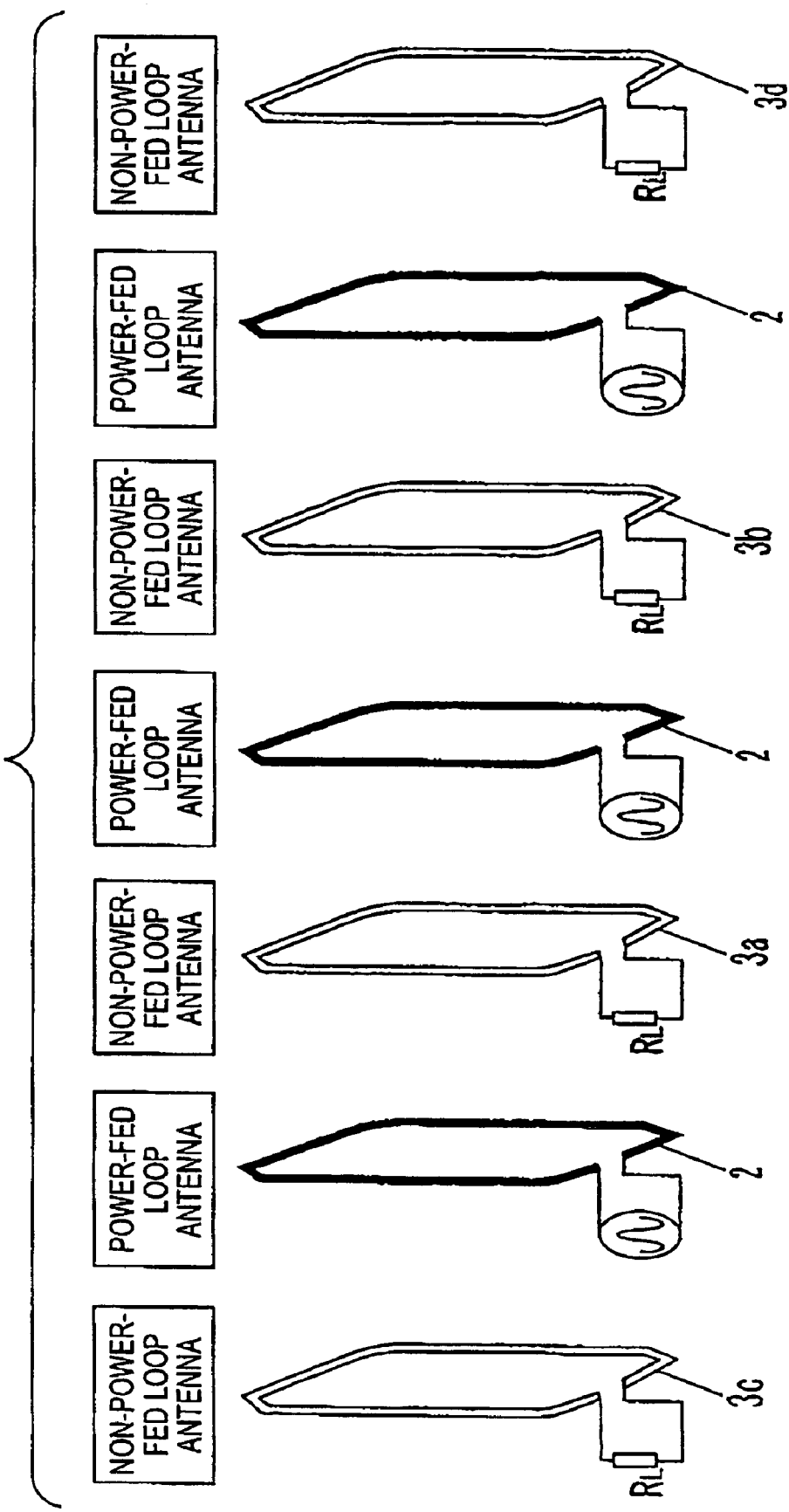
FIG. 16 is a diagram of another configuration of a gate antenna device according to Embodiment 4 of the invention.

FIGS. 14, 15, and 16 are configuration diagrams of a gate antenna device according to Embodiment 4 of the invention. Reference numerals 3a and 3b represent non-power-fed loop antennas.

FIGS. 14 and 15 show a situation in which non-power-fed loop antennas 3 are provided on both sides of a power-fed loop antenna 3. Specifically, the power-fed loop antenna 3 is provided such that it is sandwiched by non-power-fed loop antennas 3a and 3b. The power-fed loop antenna 2 and the non-power-fed loop antennas 3a and 3b are preferably provided such that their open planes are in parallel with each other, but they may be arranged differently. The intervals between the power-fed loop antenna 2 and the non-power-fed loop antenna 3a and 3b are preferably equal to or smaller than a distance at which a magnetic field generated by the power-fed loop antenna sufficiently contributes to the generation of an induction current through mutual inductance. Further, the intervals are preferably equal to or smaller than a distance at which a sufficient distance can be maintained to allow communication with an IC-integrated medium present in the vicinity of the loop antennas.

As described in Embodiment 1, an induction current is generated at the non-power-fed loop antennas 3a and 3b under the influence of a magnetic field generated by the power-fed loop antenna 2 to generate a current through the non-power-fed loop antennas 3a and 3b. The current generates a magnetic field at the non-power-fed antennas 3a and 3b to allow the non-power-fed antennas 3a and 3b to also operate as antennas which can supply power and data to an IC-integrated medium.

In the case of a gate antenna device constituted by a combination of the power-fed loop antenna 2 and the non-power-fed loop antenna 3a only, communication can be established with an IC-integrated medium present in the vicinity of those antennas. However, the range of communication is smaller for an IC-integrated medium present on the side of the power-fed loop antenna 2 opposite to the side on which the non-power-fed loop antenna 3a exists. Even in such a case, the range of communication with the IC-integrated medium can be expanded by providing the non-power-fed loop antenna 3b on the side opposite to the non-power-fed loop antenna 3a. Specifically, communication can be established with an IC-integrated medium which is located in the space sandwiched by the non-power-fed loop antenna 3b and the power-fed loop antenna 2 as shown in FIG. 14 or which is located outside the non-power-fed loop antenna 3b. The range of communication is thus expanded. That is, by providing the non-power-fed loop antennas 3a and 3b on both sides of the power-fed loop antenna 2 (or providing the power-fed loop antenna 2 such that it is sandwiched by the non-power-fed loop antennas 3a and 3b), the power and data can be supplied to an IC-integrated medium in wide ranges on both sides of the power-fed loop antenna 2 by the contribution of a magnetic field, and the range of communication is thus expanded.

At this time, a terminating resistance 5 and a resonance circuit 9 (not shown) are preferably connected to the non-power-fed loop antennas to achieve impedance matching. Although not illustrated, an electromagnetic wave leakage prevention plate is preferably provided outside the non-power-fed loop antennas to attenuate a distant electric field.

It is preferable that the number of the non-power-fed loop antennas provided on both sides of the power-fed loop antenna 2 is further increased to expand the communication range further.

The configuration as shown in FIG. 15 expands the communication range to the distance of non-power-fed loop antennas 3c and 3d, which makes it possible to provide a gate antenna device which can communicate with an IC-integrated medium in a wider range.

Even in such a case, since the antennas other than the power-fed loop antenna 2 are non-power-fed loop antennas in which no self-feeding takes place, the power to the power-fed loop antenna 2 can be suppressed, and the power consumption of the device as a whole can be also suppressed. When all antennas are power-fed loop antennas 2, it is necessary to perform a process of absorbing phase differences of a signal current between the loop antennas. There is an advantage that the need for such a process is eliminated.

Although FIGS. 14 and 15 show a case in which one each non-power-fed loop antennas is provided on both sides of one power-fed loop antenna 2 and a case in which two each non-power-fed loop antennas 3a to 3d are provided, respectively, three or more non-power-fed loop antennas may be provided on both sides, and non-power-fed loop antennas may be provided on both sides in different quantities. What is needed is to provide them appropriately according to specifications that the gate antenna device 1 must satisfy. When a further expansion of communication range is desired, two or more power-fed loop antennas may be provided as shown in FIG. 16, and the power-fed loop antennas may be disposed in arbitrary positions relative to a plurality of non-power-fed loop antennas.

The range of communication with an IC-integrated medium can be further expanded without increasing power consumption by providing non-power-fed loop antennas on both sides of a power-fed loop antenna or providing non-power-fed loop antennas such that they sandwich a power-fed loop antenna.

An IC-integrated media reader/writer may be connected to such a gate antenna device, which allows authentication at a gate of an airport or store or authentication of a commodity using an authentication device to be performed in a wide range.

There is provided a gate antenna device having two loop antennas which supplies power to an IC-integrated medium through electromagnetic induction and acquires reception data in the form of a fluctuation of a load from the IC-integrated medium. One of the loop antennas is configured as a power-fed loop antenna to which power is fed, and the other is configured as a non-power-fed antenna to which no power is fed. Thus, an induction current is generated at the non-power-fed loop antenna by an electromagnetic wave generated by the power-fed loop antenna. A current can therefore be generated at the non-power-fed loop antenna without feeding power thereto, thereby allowing also the non-power-fed loop antenna to operate as an antenna which radiates an electromagnetic wave. The device expands the distance and range of communication with an IC-integrated medium and can therefore be used in applications in which the accuracy of writing in an IC-integrated medium must be improved.

This application is based upon and claims the benefit of priority of Japanese Patent Application No 2003-308560 filed on Mar. 9, 2001, Japanese Patent Application No 2003-392238 filed on Mar. 11, 2001, the contents of which are incorporated herein by references in its entirety.

What is claimed is:

1. A gate antenna device having a plurality of antennas, wherein the plurality of antennas include a power-fed antenna to which a signal current is supplied and a non-power-fed antenna to which no signal current is supplied, wherein the power fed loop antenna is surrounded by a bag-shaped comb-type conductive line having a comb-type arrangement.

2. A gate antenna device having a plurality of antennas, wherein the plurality of antennas include a power-fed antenna to which a signal current is supplied and a non-power-fed antenna to which no signal current is supplied, wherein the plurality of antennas are loop antennas having an open plane and wherein the plurality of loop antennas include a power-fed loop antenna to which a signal current is supplied and a non-power-fed loop antenna to which no signal current is supplied, wherein the power fed loop antenna is surrounded by a bag-shaped comb-type conductive line having a comb-type arrangement.

3. A gate antenna device having a plurality of antennas, wherein the plurality of antennas include a power-fed antenna to which a signal current is supplied and a non-power-fed antenna to which no signal current is supplied, wherein the plurality of antennas are loop antennas having an open plane and wherein the plurality of loop antennas include a power-fed loop antenna to which a signal current is supplied and a non-power-fed loop antenna to which no signal current is supplied, wherein at least one power-fed loop antenna is provided such that it is sandwiched by a plurality of the non-power-fed loop antennas.

4. A gate antenna device having a plurality of antennas, wherein the plurality of antennas include a power-fed antenna to which a signal current is supplied and a non-power-fed antenna to which no signal current is supplied, wherein the plurality of antennas are loop antennas having an open plane and wherein the plurality of loop antennas include a power-fed loop antenna to which a signal current is supplied and a non-power-fed loop antenna to which no signal current is supplied, said gate antenna device further comprising another power fed loop antenna and another non-power fed loop antenna, wherein the power-fed loop antennas and the non-power-fed loop antennas are alternately provided.

5. A gate antenna device comprising one or more antenna sets, wherein each antenna set is constituted by a power-fed antenna to which a signal current is supplied and a non-power-fed antenna to which no signal current is supplied, the antennas being provided adjacent to each other to form a pair, wherein the one or more antenna sets are provided in a space having X, Y, and Z axes which are orthogonal to each other, the antenna sets being provided on two or more of the X, Y, and Z axes.

6. The gate antenna device according to claim 5, wherein adjoining ones of the antenna sets cross each other at an angle of about 90 deg when the antenna sets are disposed on four planes in an imaginary space formed on the X, Y, and Z axes and wherein the signal current supplied to the power-fed antennas included in the antenna sets is supplied at a sequential phase difference of 90 deg each time it is switched from one of the four planes on which the antenna sets are provided to another.

7. The gate antenna device according to claim 5, wherein the antenna set is a loop antenna set comprising a power-fed loop antenna having a loop-like configuration to which a signal current is supplied and a non-power-fed loop antenna having a loop-like configuration to which no signal is supplied.

8. The antenna device according to claim 7, wherein a non-power-fed loop antenna having the greatest opening is provided at least on a plane along one axis among a plurality of planes in the imaginary space formed by the X, Y, and Z axes and wherein one or more loop antenna sets are provided on the planes along the remaining axes.

9. A gate antenna device having a plurality of antennas, wherein:
the plurality of antennas include a power-fed antenna to which a signal current is supplied and a non-power-fed antenna to which no signal current is supplied;
each of the plurality of antennas is provided on two or more planes in an imaginary space formed by X, Y, and Z axes which are orthogonal to each other; and
the power-fed antenna is provided on at least one of the planes in the imaginary space and the non-power-fed antenna is provided on another of the planes.

10. The gate antenna device according to claim 9, wherein the antennas are provided on the planes in the imaginary space formed by the X, Y, and Z axes except one or more of the planes.

11. The gate antenna device according to claim 9, wherein:
a box-like body is formed in the imaginary space formed by the X, Y, and Z axes;
the plurality of antennas are provided on two or more planes of the box-like body; and
at least one of the plurality of antennas provided on the plane is the power-fed antenna, and another is the non-power-fed antenna.

12. The gate antenna device according to claim 11, wherein at least one of the planes of the box-like body is an open plane.

13. The gate antenna device according to claim 11, wherein the box-like body is a commodity case.

14. The gate antenna device according to claim 9, wherein the plurality of antennas are loop antennas having a loop-like configuration and wherein the plurality of loop antennas include a power-fed loop antenna to which a signal current is supplied and a non-power-fed loop antenna to which no signal current is supplied.

15. The gate antenna device according to claim 9, wherein the non-power-fed antenna having the greatest opening is provided at least on a plane along one axis among a plurality of planes in the imaginary space formed by the X, Y, and Z axes and wherein one or more of power-fed antennas and non-power-fed antennas are provided on the planes along the remaining axes.

16. A radio communication media processing apparatus comprising:
a gate antenna device having a plurality of antennas and communicating with a radio communication medium, the plurality of antennas including a power-fed antenna to which a signal current is supplied and a non-power-fed antenna to which no signal current is supplied;
a modulation unit for modulating data to be transmitted to the radio communication medium;
a demodulation unit for performing data demodulation on a signal from the radio communication medium received by the gate antenna device; and
a control unit for controlling the modulation unit and the demodulation unit,
wherein the plurality of antennas are provided on two or more planes in an imaginary space formed on X, Y, and Z axes which are orthogonal to each other.

17. A radio communication media processing apparatus comprising:
a gate antenna device having a plurality of antennas and communicating with a radio communication medium, the plurality of antennas including a power-fed antenna to which a signal current is supplied and a non-power-fed antenna to which no signal current is supplied;
a modulation unit for modulating data to be transmitted to the radio communication medium;
a demodulation unit for performing data demodulation on a signal from the radio communication medium received by the gate antenna device; and
a control unit for controlling the modulation unit and the demodulation unit, wherein the plurality of antennas are provided on two or more planes of a box-like body formed on X, Y, and Z axes.

18. A radio communication media processing apparatus comprising:

a gate antenna device having a plurality of antennas and communicating with a radio communication medium, the plurality of antennas including a power-fed antenna to which a signal current is supplied and a non-power-fed antenna to which no signal current is supplied;

a modulation unit for modulating data to be transmitted to the radio communication medium;

a demodulation unit for performing data demodulation on a signal from the radio communication medium received by the gate antenna device; and a control unit for controlling the modulation unit and the demodulation unit, said radio communication media processing apparatus further comprising a determination unit for determining data demodulated by the demodulation unit.

19. A radio communication media processing apparatus comprising:

a gate antenna device having a plurality of antennas and communicating with a radio communication medium, the plurality of antennas including a power-fed antenna to which a signal current is supplied and a non-power-fed antenna to which no signal current is supplied;

a modulation unit for modulating data to be transmitted to the radio communication medium;

a demodulation unit for performing data demodulation on a signal from the radio communication medium received by the gate antenna device; and a control unit for controlling the modulation unit and the demodulation unit, said radio communication media processing apparatus further comprising an error detection unit for detecting an error in data demodulated by the demodulation unit.

* * * * *